United States Patent [19]

Cupp et al.

[11] 4,194,852

[45] Mar. 25, 1980

[54] APPLICATOR WITH MULTI-POSITIONAL HANDLE

[75] Inventors: Charles D. Cupp, Lancaster; Bruce J. Matthies, Clarence Center; Frederick J. Wood, Jr., Lancaster, all of N.Y.

[73] Assignee: Shur-Line Manufacturing Co., Inc., Lancaster, N.Y.

[21] Appl. No.: 907,814

[22] Filed: May 19, 1978

Related U.S. Application Data

[62] Division of Ser. No. 847,763, Nov. 2, 1977, Pat. No. 4,127,911.

[51] Int. Cl.$^2$ .......... F16B 7/18

[52] U.S. Cl. .......... 403/299; 403/343; 15/145

[58] Field of Search .......... 403/299, 343; 85/32 V; 15/145

[56] References Cited

U.S. PATENT DOCUMENTS

| | | | |
|---|---|---|---|
| 3,054,145 | 9/1962 | Helpa | 85/32 V X |
| 3,076,217 | 2/1963 | Scholl | 15/145 |
| 3,391,419 | 7/1968 | Thorne-Thomsen | 403/343 X |
| 3,717,896 | 2/1973 | Chase et al. | 15/145 X |

FOREIGN PATENT DOCUMENTS

| | | | |
|---|---|---|---|
| 748044 | 4/1933 | France | 403/343 |
| 6512913 | 4/1966 | Netherlands | 15/145 |

*Primary Examiner*—Andrew V. Kundrat

*Attorney, Agent, or Firm*—Sommer & Sommer

[57] ABSTRACT

An applicator for applying a liquid coating to a suitable object includes a pad and a detachable handle. The pad includes a cushion, working means applied to the cushion lower surface, and a backing plate secured to the cushion upper surface. The plate is provided with hooks extending upwardly from its upper surface, and each hook is arranged along one of three sides of an imaginary square so as to capture an object slidably inserted into this imaginary square from the fourth side thereof. The handle has, adjacent one end, an outturned square perimetrical flange which is adapted to be inserted into engagement with the hooks at any of four angular positions. The applicator may further include an adapter arranged to be inserted into the open end of the tube-like handle, to modify the same to matingly receive the threaded end porion of an extension pole.

3 Claims, 8 Drawing Figures

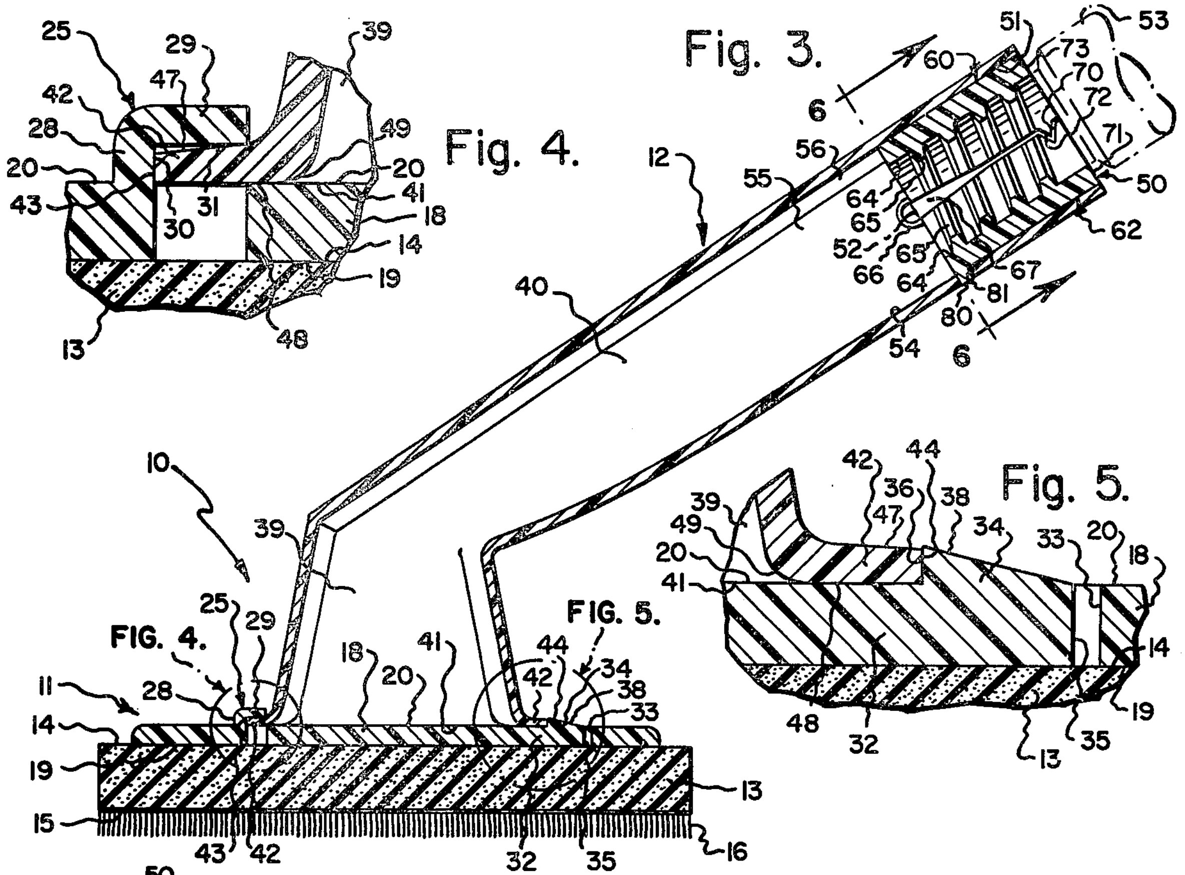
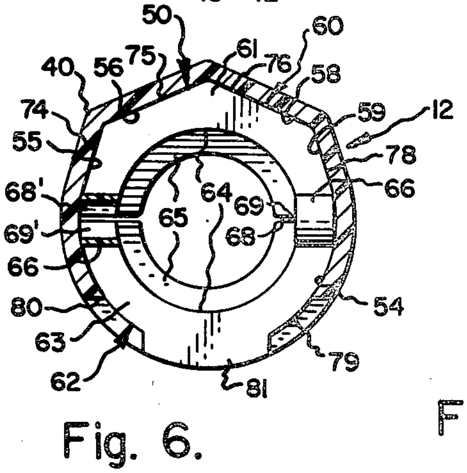
Fig. 6.
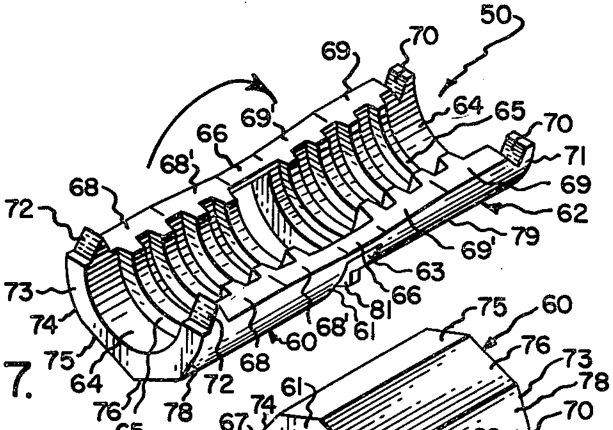
Fig. 7.
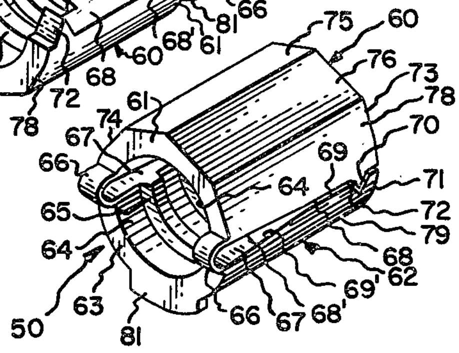
Fig. 8.

APPLICATOR WITH MULTI-POSITIONAL HANDLE

This is a divisional application of pending application Ser. No. 847,763, filed Nov. 2, 1977 and now U.S. Pat. No. 4,127,911.

BACKGROUND OF THE INVENTION

1. Field of the Invention

The present invention relates generally to apparatus for applying liquid coatings, such as paint, varnish, lacquer, shellac and the like, to a suitable object.

2. Description of the Prior Art

While the conventional paint brush is perhaps the most common means for applying a liquid coating to an object, other types of applicators have been developed in recent years.

One such other applicator includes a pad provided with a suitable bristled surface, and which may be manipulated by means of a graspable handle. However, it is desirable that the handle be detachable from the pad for ease in clean-up operations. It is generally desirable that the handle be attachable in different positions to the pad so as to afford versatility in painting a variety of objects. Moreover, it may also be desirable to attach an extension pole to the handle for ease in painting otherwise unreachable areas.

SUMMARY OF THE INVENTION

The present invention provides improved apparatus for applying a liquid coating, such as paint and the like, to a suitable object.

The improved apparatus broadly comprises a pad and a detachable handle.

The pad includes a cushion having upper and lower planar surfaces, working means applied to the cushion lower surface, and a backing plate having a lower surface attached to the cushion and also having an upper surface. The plate is provided with at least three hooks extending upwardly from its upper surface, one of these hooks being arranged along each of three sides of an imaginary square. These hooks are arranged to face inwardly of the imaginary square to capture an object slidably inserted into the imaginary square from the fourth side thereof.

The handle has, adjacent one end, a square plate-like flange extending outwardly therefrom. The dimensions of this handle flange are slightly smaller than the dimensions of the imaginary square. The flange is adapted to be slidably inserted into the imaginary square from the fourth side thereof to be captured by the hooks. The handle may be mounted on the pad in any of four positions at which the sides of the flange will be parallel to the sides of the imaginary square.

In the preferred embodiment, the backing plate is provided with a flexible tongue, and a locking boss is mounted on this tongue and is arranged along the fourth side of the imaginary square. This locking boss has a surface arranged to face inwardly of the imaginary square. The locking boss is mounted for movement between an extended position, at which the locking boss surface will prevent withdrawal of the handle flange, and a retracted position, at which such flange may be withdrawn from its operative engagement with the hooks.

The apparatus may further include an adapter insertable into the open end of the handle or a tube to modify the same to matingly receive the externally-threaded portion of a member. This adapter comprises a first section having an end surface, and a second section having an end surface. Each of these sections has a substantially cylindrical inner surface provided with cooperative internally-threaded recess segments, has an outer surface simulating the cross-sectional shape of opposite halves of the tube, and has two longitudinal surfaces joining the inner, outer and end surfaces. At least one flexible web section is arranged to be folded through an arc of approximately 180 degrees to overlie the second section through compliant flexure of the web such that the section longitudinal surfaces will be arranged to face one another to form an adapter having an internally-threaded recess and an external surface simulating the cross-sectional shape of the tube. In this manner, the adapter may be inserted into the handle or tube to modify the same to matingly receive the externally-threaded portion of a member. The two sections may be provided with a pin-recess connection to align such sections during the folding operation. The tube may be provided with at least one radial opening, and at least one of the sections may be provided with a lug arranged to be received in said opening to prevent unintended withdrawal of the adapter from the tube.

Accordingly, one object of the present invention is to provide an applicator for applying a liquid coating to a suitable object.

Another object is to provide an improved applicator having a pad and a detachable handle, which may be mounted on the pad in any of four angular positions spaced from one another at ninety degree intervals.

Another object is to provide an improved applicator wherein a handle may be readily mounted on or detached from a pad.

Another object is to provide an adapter insertable into an open end of an applicator handle, or some other tubular object, to modify the same to matingly receive the externally-threaded end portion of a member.

These and other objects and advantages will become apparent from the foregoing and ongoing specification, the drawings and the appended claims.

BRIEF DESCRIPTION OF THE DRAWINGS

FIG. 3 is an enlarged vertical sectional view thereof, taken longitudinally through the handle and pad on line 3—3 of FIG. 2, this view showing the adapter inserted into the upper marginal end portion of the handle, and also showing the handle perimetrical flange as being captured by a hook and engaged by the locking boss.

FIG. 4 is a further enlarged fragmentary vertical sectional view of the structure within the indicated circle of FIG. 3, this view showing a hook as capturing a portion of the handle flange.

FIG. 5 is a further enlarged fragmentary vertical sectional view of the structure within the indicated circle of FIG. 3, this view showing the locking boss on the tongue as arranged to prevent unintended separation of the handle from the backing plate.

FIG. 6 is a further enlarged fragmentary transverse sectional view thereof, taken generally on line 6—6 of FIG. 3, this view showing an end elevation of the adapter inserted into the handle.

FIG. 7 is a perspective detail view of the adapter prior to folding, this view showing the two adapter sections connected by the flexible webs.

FIG. 8 is a perspective detail view of the adapter, but showing the first section as having been folded to overlie the second section through permissive compliant flexure of the webs.

DESCRIPTION OF THE PREFERRED EMBODIMENTS

Figure 1:
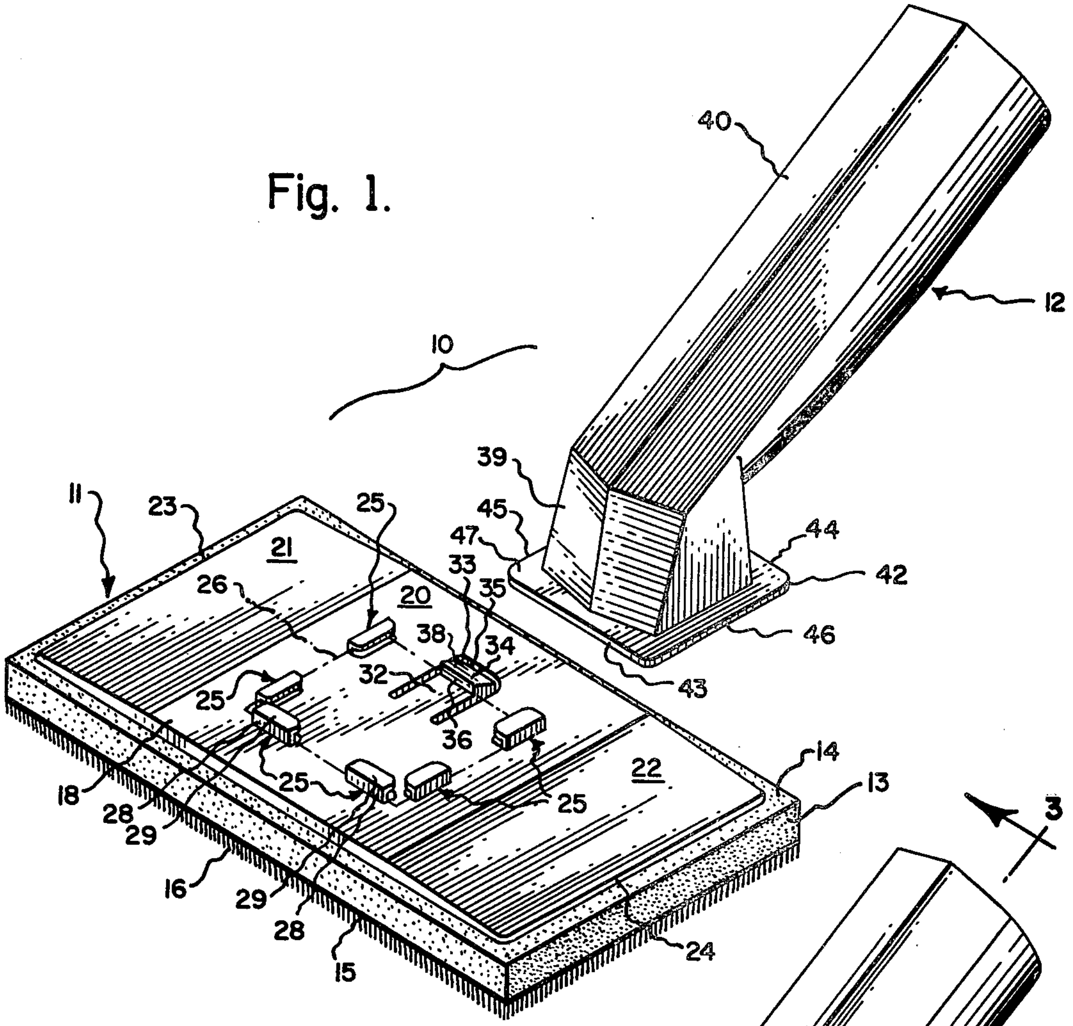
FIG. 1 is an exploded perspective view of the improved applicator taken from the front and left side thereof, this view showing the handle detached from the pad.

At the outset, it should be clearly understood that like reference numerals are intended to identify the same elements and/or structure consistently throughout the several drawing figures, as such elements and/or structure may be further described or explained by the entire written specification of which this detailed description is an integral part.

Figure 2:
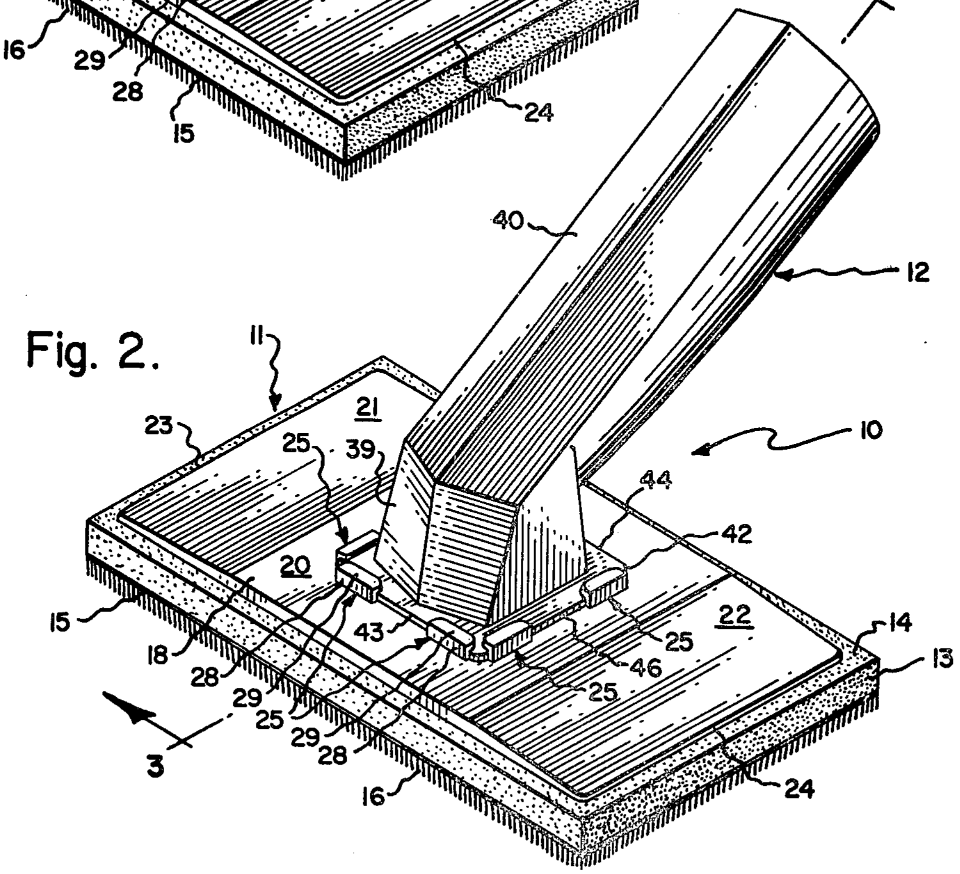
FIG. 2 is a perspective view, generally similar to FIG. 1, but showing the handle as being operatively attached to the pad.

Referring now to the drawings, and in particular to FIGS. 1 and 2 thereof, the present invention provides an improved applicator, of which the presently preferred embodiment is generally indicated at 10, for use in applying a liquid coating, such as paint and the like, to an object (not shown).

As best shown in FIG. 1, the improved applicator broadly includes a pad 11 and a detachable handle 12.

Referring now to FIGS. 1 and 3, the pad 11 is shown as including a rectangular cushion 13 formed of a suitable cellular material, such as polyurethane foam or the like. This cushion includes rectangular upper and lower planar horizontal surfaces 14, 15, respectively. The pad also includes working means 16 applied to the cushion lower surface. In the preferred embodiment, the working means is a nylon flock material electrostatically applied and adhesively bonded to the cushion lower surface. However, other means for applying bristles to the cushion lower surface could be alternatively employed, as desired. Instead of bristles, the working means 16 may comprise a layer of suitable foam material, felt, lambs wool, or the like.

Still referring principally to FIGS. 1 and 3, the pad is shown as further including a backing plate 18 having a rectangular lower planar horizontal surface 19 suitably secured, as by adhesive bonding or the like, to the cushion upper surface 14. As best shown in FIG. 1, this backing plate is a horizontally-elongated rectangular member having a rectangular central horizontal planar upper surface 20, and having two inclined rectangular planar surfaces 21, 22 extending downwardly from central surface 20 toward its vertical right and left side surfaces 23, 24 respectively. Thus, the backing plate has a central portion of uniform thickness between upper and lower surfaces 20, 19, and has two tapered wings extending laterally outwardly therefrom and decreasing in thickness toward the appropriate side surfaces.

As best shown in FIG. 1, the preferred embodiment of backing plate 18 is provided with two hooks, severally indicated at 25, arranged along each of three sides of an imaginary square, this imaginary square being shown in phantom and indicated at 26. This imaginary square is centrally located on the backing plate upper surface 20, and has two of its sides arranged substantially parallel to the backing plate side surfaces 23, 24.

Referring now to FIGS. 1, 3 and 4, each hook 25 is shown as having a leg portion 28 upstanding from backing plate surface 20, and having an inturned portion 29 extending inwardly of imaginary square 26 from the upper margin of the associated leg portion. As best shown in FIG. 4, each leg portion 28 has a vertical surface 30 coplanar with a side of imaginary square 26, and each inturned portion 29 has a lower horizontal surface 31 spaced above backing plate upper surface 20. Of course, these hooks 25 are so arranged on three sides of the imaginary square as to capture an object slidably inserted into the square from the fourth side thereof. Notwithstanding that the preferred embodiment is shown as including two of such hooks 25 along each side of the square, the present invention contemplates that the number, spacing and length of these hooks may be varied, as desired. Hence, only one such hook need be provided along each of the three sides of the square, and such hook may be elongated to the extent desired.

Referring now to FIGS. 1, 3 and 5, the preferred form of backing plate 18 is shown as further provided with an intermediate integrally-formed rearwardly-extending cantilevered tongue 32 defined by a U-shaped slot 33 thereabout. As best shown in FIG. 5, a locking boss 34 extends upwardly from the upper surface of the tongue proximate its free or unsupported end 35, and this locking boss has an inwardly-facing vertical surface 36 arranged to be substantially coplanar with the fourth side of the imaginary square, and also has an inclined cam surface 38 joining the tongue end 35 with the upper margin of locking boss surface 36. Of course, since this tongue is mounted as a cantilever, persons skilled in this art will readily appreciate that the tongue is flexible and may readily be manually moved downwardly from its normal upwardly extended position (FIG. 5) at which the locking boss surface 36 will extend above backing plate surface 20 to prevent sliding withdrawal of a suitable object from the imaginary square, to a retracted position (not shown) at which the locking boss will be below backing plate surface 20. In its retracted position, the tongue will permit an object captured by hooks 25 to be slidably withdrawn from the imaginary square through the fourth side thereof. Of course, to move the tongue from its normal extended position to its retracted position, an operator need only press downwardly on the locking boss to cause such permissive flexure of the tongue, this flexure being permitted by compressive deformation of the cushion therebeneath.

Referring now to FIGS. 1–3, the handle 12 is shown as being a hollow tubular dog-leg shaped member having a lower portion 39 proximate the pad and having an upper graspable portion 40. Handle 12 is shown as having about its open lower end 41, an outturned horizontal plate-like flange 42. Specifically, this perimetrical flange 42 has a generally square outline, and is bounded by vertical front and rear side surfaces 43, 44, and vertical left and right side surfaces 45, 46, respectively. The lower surface of flange 42 is flat and horizontal, but its upper surface preferably tapers downwardly and outwardly toward its free edge, as indicated at 47. Thus, flange 42 is thicker remote from its said edge than the vertical spacing between backing plate upper surface 20 and lower surface 31 of inturned portion 29 of hook 25. This produces a wedging action when flange 42 is inserted under hooks 25, causing the latter to act as springs clamping the flange against the backing plate and providing a snug connection between the handle and backing plate.

The length of the flange square sides, 43 through 46, is slightly less than the length of the sides of the imaginary square 26 so that the flange 42 may be aligned with the hooks and thereafter slidably inserted into captured engagement therewith. Since the handle flange 42 is square, it is evident that the handle flange may be inserted into engagement with the hooks at any of four angular positions at which the sides of the flange will be substantially parallel to the sides of the imaginary square. This feature allows the position of the handle inclined graspable portion to be oriented differently with respect to the pad.

When the handle flange is slidably moved into engagement with the hooks, the lower surface 48 of the handle flange will ride on locking boss cam surface 38 and will cause the flexible tongue to be moved downwardly, to its retracted position to permit such insertion. Adverting now to FIGS. 3 and 5, when an operator desires to detach the handle 12 from pad 11, he need only depress the tongue so that the appropriate flange surface, indicated at 44 in FIG. 5, will not abut the locking boss surface 36. Thereafter, the handle flange may be slidably withdrawn from its engagement with the hooks. While the tongue may move back to its normal position when the handle has been moved such that the locking boss will be aligned with the handle open end 41, the inner edge of the handle joining the flange and lower portion is rounded, this being indicated at 49 in FIGS. 4 and 5, to permit the trailing part of the perimetrical flange to ride over the locking boss and again depress tongue 32 as such removal continues.

Referring now to FIG. 3, the handle 12 is shown as further including an adapter, generally indicated at 50, inserted into the upper open end 51 of the handle graspable portion to modify the same to receive the externally-threaded marginal end portion 52 of a member, such as extension pole 53.

As best shown in FIG. 6, the handle graspable portion 40 is shown as being a thin-walled tube having its inner surface provided with, in transverse cross-section, a lower semi-cylindrical surface 54, and an upper polygonal surface including planar surfaces 55, 56, 58 and 59.

Referring now in particular to FIG. 7, the adapter 50 is shown as being a horizontally-elongated generally U-shaped member in its unfolded condition. Specifically, this adapter 50 includes a leftward first section 60 having a vertical right end surface 61, and a rightward second section 62 having a vertical left end surface 63. Each section is shown as having a substantially semi-cylindrical inner surface 64 from which cooperative internally-threaded recess segments 65 extend into the associated member so that when the first section 60 is folded to overlie the second section 62, these recesses will define a substantially continuous internal helical thread arranged to matingly receive the externally-threaded marginal end portion 52 of extension pole 53. The two insert sections 60, 62 are shown as being joined by two flexible webs severally indicated at 66, connecting the facing section end surfaces 61, 63, proximate inclined portions 68′, 69′ of upper longitudinal surfaces 68, 69, of the first and second sections, respectively. As best shown in FIGS. 3 and 8, these webs 66 are relatively thin strap-like members which function to join the insert sections together, and as a hinge to permit the first section to be folded to overlie the second section. When first section 60 overlies second section 62, as depicted in FIG. 8, inclined portions 68′, 69′ overlie each other on each side of the adapter in spaced relation to provide jointly a wedge-shaped clearance indicated at 67. The point of such wedge-shaped clearance is adjacent the inner ends of planar surfaces 68, 69 and the wide end of this clearance is adjacent end surfaces 61, 63. This clearance 67 allows the hinged ends of sections 60, 62 to move radially toward each other for a purpose which will be explained later herein.

Adverting now to FIG. 7, a pair of triangular recesses, severally indicated at 70, extend downwardly into the second section from its two longitudinal surfaces 69, 69 proximate its vertical right end surface 71, and the first section is shown provided with a pair of triangular pins 72, 72 upstanding from its two longitudinal surfaces 68, 68 adjacent its vertical left end face 73. As best shown in FIGS. 3 and 8, these first section pins 72, 72 are adapted to be received in the second section recesses 70, 70 when the insert is folded, to properly align the two sections so that the section recesses 65, 65 will define a substantially continuous helical internal thread therebetween. Also, in the folded condition (FIG. 8), the first section right and left end surfaces 61, 73 will be substantially coplanar with the second section left and right end surfaces 63, 71, respectively. Opposing pins 72 and recesses 70 may be located anywhere along surfaces 68 and 69, respectively, as desired, such as toward the center rather than toward the ends.

Each of the adapter sections 60, 62 has an outer surface configured to the shape of approximately ½ of the tube. Thus, the outer surface of first section 60 is shown as being polygonal in cross-section, and specifically includes planar surfaces 74, 75, 76 and 78 which are arranged to face tube surfaces 55, 56, 58 and 59, respectively, when the adapter is inserted into the tube. Similarly, the outer surface 79 of adapter second section is semi-cylindrical and is arranged to face tube surface 54 when the adapter is inserted into the tube. It should be noted that since the adapter outer surface is not totally cylindrical, the inserted adapter will be locked against rotation relative to the tube when the extension pole is threaded into or out of engagement with the adapter.

Referring now to FIGS. 3 and 8, the hollow handle graspable portion 40 is shown as being further provided with a circumferentially-elongated rectangular through slot 80 in its wall on one side. The adapter second section 62 includes a radially outwardly projecting locking lug 81 adjacent its left end face 63, and this locking lug is adapted to be received in handle slot 80 when the adapter is inserted into the open end 51 thereof. In this operative position, the locking lug functions to prevent unintended axial movement of the insert relative to the tube, and also assists in preventing relative rotation between the insert and tube. If desired, another slot and lug connection can be provided on the other side of the handle.

In order to insert the hinged end of the adapter into the applicator handle, the sections 60, 62 are squeezed together at their ends connected by webs 66 to reduce the transverse dimension of the insert including its lug 81 sufficiently to allow the collapsed end of the insert to enter the bore of the handle, clearance 67 permitting of this collapse. Such squeezing together of the sections 60, 62 causes them to fulcrum on each other at the inner end or point of clearance 67, thereby bending the central portions of these sections and placing them in resilient tension. The collapsed end of the insert is then pushed into the hollow handle until lug 81 is opposite slot 80, whereupon the tension in the bent sections 60, 62 causes them to spread apart to move this lug into this opening, recreating clearance 67, and thereby locking the insert against withdrawal longitudinally from the handle.

While it is presently preferred to form the backing plate, handle and insert of a suitable plastic material, such as ABS or polypropylene, other materials may be substituted therefor.

Therefore, while the preferred embodiment of the present invention has been shown and described, and several modifications thereof discussed, persons skilled in this art will appreciate that various additional changes and modifications may be made without departing from the spirit of the invention which is defined in the following claims.

What is claimed is:

1. An adapter insertable into the open end of a tube to modify the same to matingly receive the externally-threaded portion of a member, said tube being provided with an opening therethrough, said adapter comprising:

a first section having an end surface;

a second section having an end surface;

each of said sections having a substantially semi-cylindrical inner surface provided with cooperative internally-threaded recess segments, having an outer surface simulating half of the cross-sectional shape of said tube, and having longitudinal surfaces joining said inner, outer and end surfaces;

at least one flexible web joining said section end surfaces;

said first section being arranged to be folded through an arc of approximately 180 degrees to overlie said second section through compliant flexure of said web such that said section longitudinal surfaces will be arranged to face one another to form an adapter having an internally-threaded recess and an external surface simulating the cross-sectional shape of said tube;

one of said sections being provided with a lug arranged to be received in said tube opening when said adapter is inserted into said tube to prevent unintended withdrawal of said adapter from said tube;

whereby said adapter may be inserted into said tube to modify the same to matingly receive the externally-threaded portion of a member.

2. The adapter as set forth in claim 1 wherein one of said sections is provided with a recess extending into said section from one of its longitudinal surfaces, and wherein the other of said sections is provided with a pin extending outwardly from one of its longitudinal surfaces, said recess being adapted to receive said pin to align said internally-threaded recess segments when said sections are folded together.

3. The adapter as set forth in claim 1 wherein said longitudinal surfaces have opposing end portions separated by a clearance when said sections are superimposed which permits these sections at said clearance to be collapsed to reduce the transverse dimension of said adapter for insertion into said tube.

* * * * *